United States Patent
Chung et al.

(10) Patent No.: US 10,269,267 B2
(45) Date of Patent: Apr. 23, 2019

(54) CARDIOPULMONARY RESUSCITATION TRAINING APPARATUS

(71) Applicant: INNOSONIAN INC., Seoul (KR)

(72) Inventors: Mok Chung, Seoul (KR); Choung Ho Jung, Seoul (KR); Nam Hun Kim, Wonju-si (KR); Hwan Chul Kim, Bucheon-si (KR)

(73) Assignee: INNOSONIAN INC., Seoul (KR)

( * ) Notice: Subject to any disclaimer, the term of this patent is extended or adjusted under 35 U.S.C. 154(b) by 241 days.

(21) Appl. No.: 15/110,173

(22) PCT Filed: Jan. 19, 2015

(86) PCT No.: PCT/KR2015/000521
§ 371 (c)(1),
(2) Date: Jul. 7, 2016

(87) PCT Pub. No.: WO2015/108381
PCT Pub. Date: Jul. 23, 2015

(65) Prior Publication Data
US 2016/0335921 A1 Nov. 17, 2016

(30) Foreign Application Priority Data
Jan. 17, 2014 (KR) .......... 10-2014-0006194

(51) Int. Cl.
*G09B 23/28* (2006.01)
*G09B 5/02* (2006.01)

(52) U.S. Cl.
CPC .......... *G09B 23/288* (2013.01); *G09B 5/02* (2013.01)

(58) Field of Classification Search
CPC ...... G09B 23/288; G09B 5/02; A63F 13/5375
(Continued)

(56) References Cited

U.S. PATENT DOCUMENTS 6,153,109 A * 11/2000 Krivitski ............. A61M 1/3653
210/646
6,306,107 B1 * 10/2001 Myklebust ........... A61B 5/1036
128/897
(Continued)

FOREIGN PATENT DOCUMENTS

CN 201111762 9/2008
EP 1 938 779 A1 12/2007
(Continued)

OTHER PUBLICATIONS

International Search Report for PCT/KR2015/000521, dated Feb. 26, 2015, 5 pages.
(Continued)

*Primary Examiner* — Sadaruz Zaman
(74) *Attorney, Agent, or Firm* — Nixon & Vanderhye, P.C.

(57) ABSTRACT

Disclosed is a cardiopulmonary resuscitation training apparatus. The cardiopulmonary resuscitation training apparatus comprises: a mannequin; a compression plate which is provided towards the chest area of the mannequin and generates a return force; and a display unit which displays the state of the mannequin and shows blood circulation movement in light-emitting lines, in accordance with the pressing of the compression plate. The display unit can be constituted in such a way that the blood circulation movement in the mannequin is displayed by means of LEDs, and the LED movement rate is varied or the LEDs emit light in different colours in accordance with the depth of pressing or the pressing rate of the compression plate. This gives the advantage that the user can implement cardiopulmonary resuscitation close to reality while being made aware of the compression depth and the compression rate.

13 Claims, 6 Drawing Sheets

(58) Field of Classification Search
USPC ........................................................ 434/265
See application file for complete search history.

(56) References Cited

U.S. PATENT DOCUMENTS

| | | | |
|---|---|---|---|
| 6,575,914 B2 * | 6/2003 | Rock ....................... | A61B 5/061 600/500 |
| 2005/0058977 A1 | 3/2005 | Cantrell et al. | |
| 2006/0270952 A1 * | 11/2006 | Freeman ............... | A61H 31/005 601/41 |
| 2008/0227073 A1 * | 9/2008 | Bardsley ................ | G09B 23/30 434/267 |
| 2010/0021876 A1 * | 1/2010 | Clash ................... | G09B 23/288 434/265 |
| 2012/0010543 A1 * | 1/2012 | Johnson ............... | A61N 1/3925 601/41 |
| 2012/0330200 A1 * | 12/2012 | Voss ..................... | A61H 31/004 601/41 |
| 2013/0066242 A1 * | 3/2013 | Wood ................... | A61H 31/007 601/41 |
| 2013/0330698 A1 * | 12/2013 | Yang ..................... | G09B 23/288 434/265 |
| 2014/0057235 A1 * | 2/2014 | Kellum ................ | G09B 23/288 434/265 |

FOREIGN PATENT DOCUMENTS

| | | |
|---|---|---|
| JP | 47-007076 | 3/1972 |
| JP | 62-188785 | 12/1987 |
| JP | 2013-050710 A | 3/2013 |
| JP | 2013-511074 A | 3/2013 |
| KR | 10-0903554 | 6/2009 |
| KR | 10-0985078 | 10/2010 |
| KR | 20-2011-0009649 | 10/2011 |
| KR | 10-2012-0053728 | 5/2012 |
| KR | 20120053728 A * | 5/2012 |
| WO | WO 2007/057825 A2 | 5/2007 |
| WO | WO 2009/119908 A1 | 1/2009 |
| WO | WO 2011/051458 A1 | 5/2011 |

OTHER PUBLICATIONS

Written Opinion of the ISA for PCT/KR2015/000521, dated Feb. 26, 2015, 5 pages.

* cited by examiner

CARDIOPULMONARY RESUSCITATION TRAINING APPARATUS

This application is the U.S. national phase of International Application No. PCT/KR2015/000521 filed 19 Jan. 2015 which designated the U.S. and claims priority to KR Patent Application No. 10-2014-0006194 filed 17 Jan. 2014, the entire contents of each of which are hereby incorporated by reference.

TECHNICAL FIELD

Embodiments of the present invention relate to a cardiopulmonary resuscitation training apparatus, and more particularly, to a cardiopulmonary resuscitation training apparatus that may enable a trainee to understand a principle of a heartbeat, to learn realistic artificial ventilation and chest compression, and to increase skills through repeated practice.

BACKGROUND ART

In general, cardiopulmonary resuscitation is a procedure to resuscitate a victim who has slowed or stopped cardiopulmonary function by restoring the cardiopulmonary function. With respect to typical respiratory failure or apnea, a rescuer checks responsiveness, opens an airway, performs artificial ventilation, and provides cardiac massage to recover a cardiac function. In detail, the rescuer checks responsiveness by tapping shoulders of the victim, and opens the airway. The airway is a respiratory track including a nasal cavity, an oral cavity, a pharynx, a larynx, bronchi, and lungs. When cardiac arrest or apnea happens, muscle tension of a tongue decreases and the tongue blocks a pharyngeal area, which results in airway obstruction. Airway obstruction often results from consciousness disorder after cardiac arrest, apnea, head injury, or stroke happens.

In another example, the airway is obstructed by vomitus. To open the airway, the rescuer checks whether foreign materials such as vomitus are in the oral cavity and removes the materials. When the materials are removed, the rescuer lifts the neck with one hand, and tilts the head back by pressing the head with the other hand on the forehead. When the airway is opened, the rescuer checks whether the victim is breathing. If the victim is not breathing, the rescuer performs artificial ventilation as follows. Artificial ventilation refers to a procedure to artificially recover the function of the lungs to maintain normal respiration in case of suspended animation in which the victim is not breathing while the heart is still beating after drowning, poisoning, or bleeding.

Artificial ventilation as a first aid includes a method in which the rescuer exhales air into the lungs of the victim, and a method in which the rescuer compresses a chest of the victim with the hands of the rescuer to aid inhalation and exhalation. The most typical example of the air exhaling method is mouth-to-mouth resuscitation that inflates the lungs of the victim with the air exhaled thereinto through mouth-to-mouth contact.

In case of cardiac arrest after falling, electric shock, or poisoning, artificial ventilation is performed to recover the cardiac function. In detail, the rescuer pushes sterna of the victim down toward spine of the victim at least 5 cm to compress the heart to eject blood, which is called closed-chest cardiac massage. Closed-chest cardiac massage is generally referred to as cardiac massage. The rescuer initiates cardiac massage, opens the airway, and checks whether the victim is breathing. In case of apnea, the rescuer performs artificial ventilation. Such cardiopulmonary resuscitation is performed on a human body, and thus it is difficult for a performer or trainee to practice cardiopulmonary resuscitation repeatedly.

On this account, mannequins provided shapes of human bodies have been introduced. However, when performing cardiopulmonary resuscitation on a mannequin, it is difficult to know whether the heart beats at a safe rate, whether the compression depth is proper, or whether the compression rate is proper. Thus, the trainee only repeats compression without knowing whether the compression is being properly performed.

Accordingly, a mannequin that helps a trainee to understand a principle of a heartbeat and to intuitively recognize that blood of the mannequin is ejected and flows into a brain, thereby providing an effect analogous to performing cardiopulmonary resuscitation on a human body needs to be developed.

DISCLOSURE OF INVENTION

Technical Goals

An aspect of the present invention provides a cardiopulmonary resuscitation training apparatus that includes light emitting lines in a mannequin to display how blood is ejected from a heart and flows into a brain when a trainee compresses an accurate area of a chest, thereby effectively training the trainee to understand a principle of a heartbeat.

Another aspect of the present invention provides a cardiopulmonary resuscitation training apparatus that includes light emitting lines configured to emit light in different colors based on a compression depth and a compression rate, thereby enabling a trainee to recognize an accurate compression rate and an accurate compression depth and to remember cardiopulmonary resuscitation for a long time.

Still another aspect of the present invention provides a cardiopulmonary resuscitation training apparatus that is configured by copying a human body, thereby enabling a user to learn realistic cardiopulmonary resuscitation including checking responsiveness, opening an airway, checking pulse, artificial ventilation, chest compression, and use of a defibrillator or automated defibrillator and to increase skills through repeated practice without a real human body.

Technical Solutions

According to an aspect of the present invention, there is provided a cardiopulmonary resuscitation training apparatus including a mannequin, a compression plate provided in a chest area of the mannequin to generate a return force, and a display portion configured to display a state of the mannequin and blood circulation movement in a light emitting line. The display portion may be configured to display the blood circulation movement in the mannequin using a light emitting diode (LED), and a moving speed of the LED may vary based on a compression depth or a compression rate at which the compression plate is compressed or the LED may emit light in different colors based on the compression depth or the compression rate.

The display portion may be provided in the mannequin, and the mannequin may include a material that transmits the light emitted from the LED. The mannequin may include a head disposed at an upper end of the mannequin, and a body disposed at a lower end of the head. The light emitting line may be turned on in an order of the body, the head, and the body, and a plurality of light emitting lines may be provided in the body.

The compression plate may be determined to be compressed normally when the compression depth is 5 cm, and the compression plate may be determined to be compressed insufficiently when the compression depth is less than 5 cm. The plurality of light emitting lines may be turned on when the compression plate is compressed normally, the light emitting lines may not be turned on when the compression plate is compressed insufficiently, and the plurality of light emitting lines may be flashed when the compression plate is over-compressed.

The cardiopulmonary resuscitation training apparatus may further include state data on one side of the mannequin, and the state data may include a rate indicator including a bar configured to move based on the compression rate, a depth indicator including a bar configured to move based on the compression depth, and an indicator configured to determine whether the compression depth or the compression rate is proper. The compression plate may include at least one of a spring or a high-intensity compression sponge.

Further, the display portion may be configured to operate when a proper area of the compression plate is compressed. The cardiopulmonary resuscitation training apparatus may further include a metronome on one side of the mannequin to enable the compression plate to be compressed in time to beep sounds of the metronome. When the compression plate is compressed at a predetermined compression rate, a light emitting line in the head may be turned on. The cardiopulmonary resuscitation training apparatus may further include a distance measuring sensor on an outer circumferential portion of the compression plate to measure a compression distance based on an angle of reflection, and the angle of reflection may change when the compression plate is compressed.

In addition, kinetic energy generated by compressing the compression plate may be converted into electric energy and the electric energy may be utilized as a power to be used to operate the mannequin.

As described above, the cardiopulmonary resuscitation training apparatus may enable a trainee to get accustomed to a compression depth and a compression rate and to understand how blood is ejected from a heart and flows into a brain, thereby enabling the trainee to perceive a correct compression rate and a correct compression depth.

Advantageous Effect

According to an embodiment, light emitting lines may be provided in a mannequin to display how blood is ejected from a heart and flows into a brain when a trainee compresses an accurate area of a chest, thereby effectively training the trainee to understand a principle of a heartbeat.

Further, light emitting lines may be configured to emit light in different colors based on a compression depth and a compression rate, thereby enabling a trainee to recognize an accurate compression rate and an accurate compression depth and to remember cardiopulmonary resuscitation for a long time.

In addition, a cardiopulmonary resuscitation training apparatus that is configured by copying a human body, thereby enabling a user to learn realistic cardiopulmonary resuscitation including checking responsiveness, opening an airway, checking pulse, artificial ventilation, chest compression, and use of a defibrillator or automated defibrillator and to increase skills through repeated practice without a real human body may be provided.

BEST MODE FOR CARRYING OUT THE INVENTION

Figure 1:
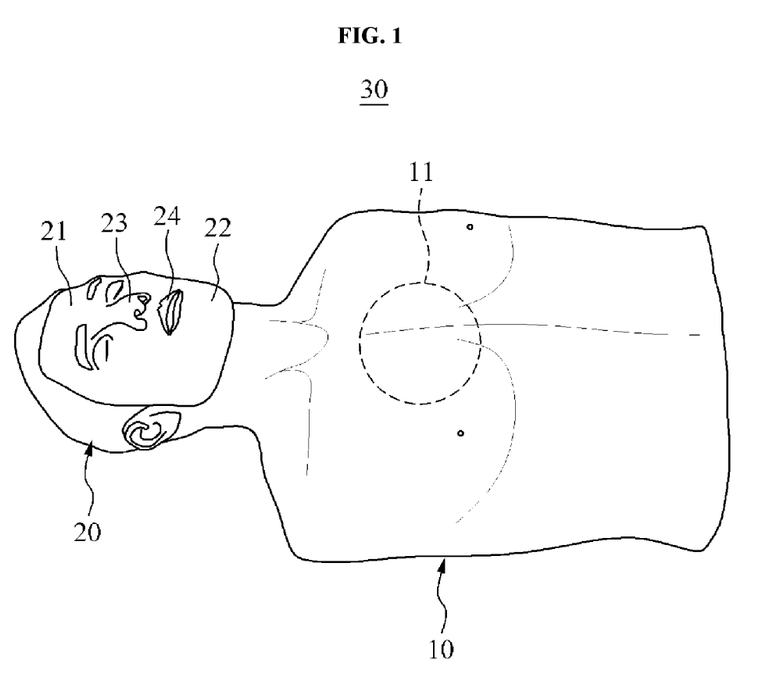
FIG. 1 illustrates a mannequin.
Figure 2:
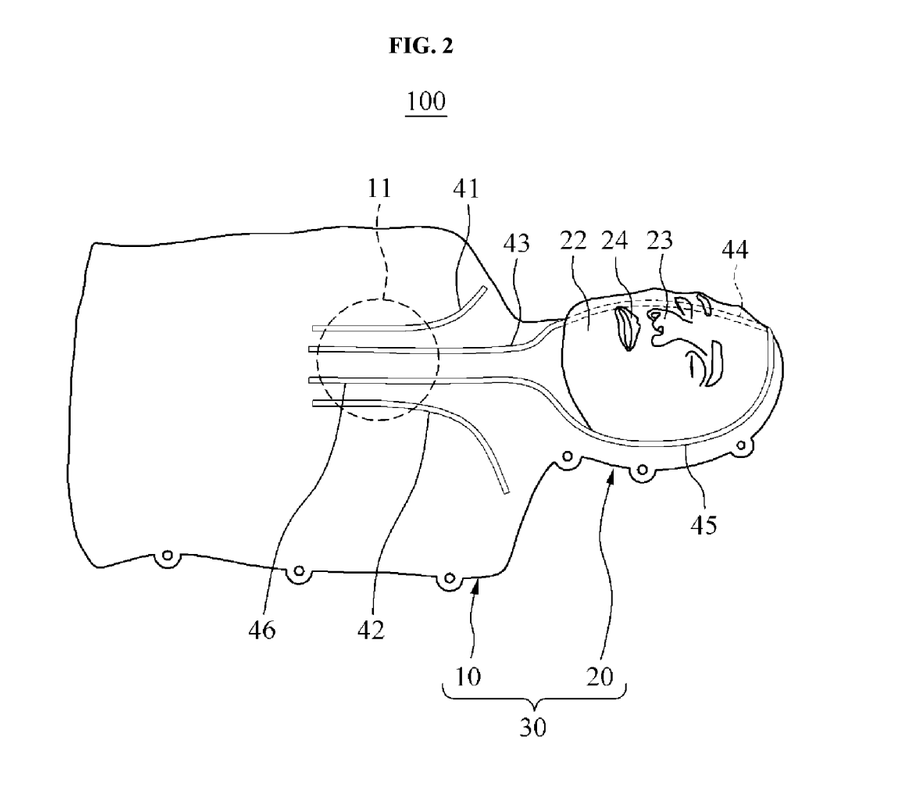
FIG. 2 illustrates a cardiopulmonary resuscitation training apparatus including a display portion.
Figure 3:
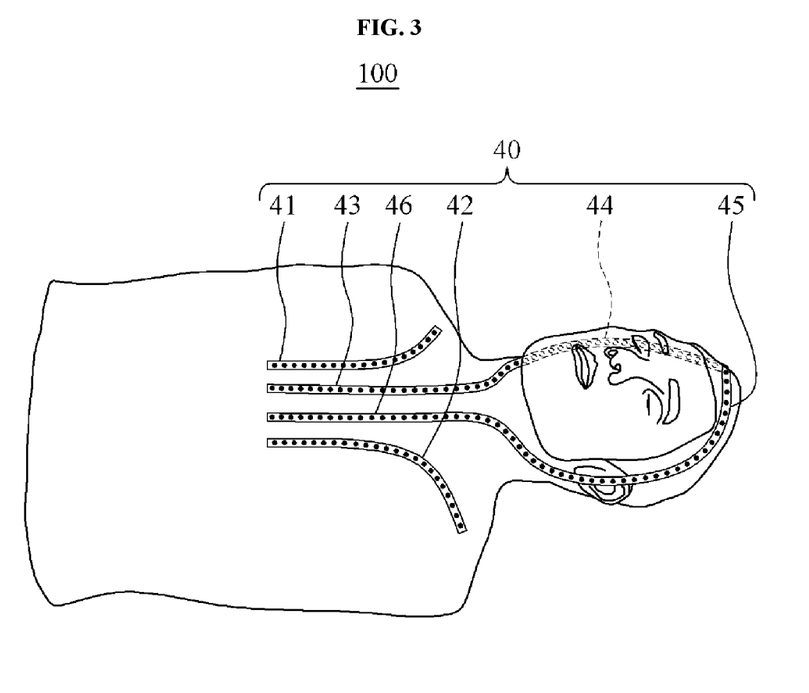
FIG. 3 illustrates an operation of turning on light emitting diodes (LEDs) in a display portion of a mannequin.

FIG. 1 illustrates a mannequin, FIG. 2 illustrates a cardiopulmonary resuscitation training apparatus including a display portion, and FIG. 3 illustrates an operation of turning on light emitting diodes (LEDs) in a display portion of a mannequin. Examples will be described with reference to FIGS. 1 through 3. A cardiopulmonary resuscitation training apparatus 100 includes a mannequin 30 provided in a shape of a human body, a compression plate 11 provided in the mannequin, and a display portion 40 configured to display state information of the mannequin when the compression plate is compressed.

The mannequin is provided in a shape similar to that of a real human body. The mannequin has an appearance corresponding to a standard somatotype of a human and is covered with skin of a silicone or urethane material which has elasticity similar to real skin. The mannequin includes a body 10 and a head 20. Joint portions of the body may be designed to implement degrees of freedom of human joints.

The head 20 of the mannequin includes a forehead 21, eyes, a nose 23, a mouth 24, and a chin 22. When the mannequin is laid on a floor, a tube 25 designed to act as an airway in a neck is pressed and blocked. To open the airway, a user may lift the chin 22 while pressing the forehead 21 down to internally release the pressed tube for artificial ventilation. When the user generally breathes during artificial ventilation, the user may see a chest rising with naked eyes. A proper tidal volume may be 500(−10%) to 600(+10%) ml.

After performing the artificial ventilation, the user compresses the compression plate 11 provided in a chest area of the body 10 of the mannequin. The user regularly presses the compression plate 11 down with heels of two clasped hands with elbows straight and vertical to the body of the mannequin.

When the user compresses the compression plate regularly, the display portion 40 provided in the mannequin operates. The display portion is configured such that light emitting lines including a luminous body of LED are provided in the mannequin in an order of the body 10, the head 20, and the body 10 of the mannequin to display blood movement in arteries from a heart to the head.

When the user compresses the compression plate, heart lines 41 and 42 provided in the heart emit light. When the user continually compresses the compression plate, a first light emitting line 43 from the heart to the head, second light emitting lines 44 and 45 circulating from left to right in the head, and a third light emitting line 46 from the head to the heart may emit light.

When the user compresses the compression plate 11 about 5 cm, two light emitting lines provided in the body, in detail, the first light emitting line 43 and the third light emitting line 46 may be turned on like normal blood flow. Conversely, when the user compresses the compression plate 11 insufficiently or less than 5 cm, the two lines of luminous bodies provided in the body may not be turned on according to a principle of a blood flow rate which decreases due to insufficient compression.

When the user compresses the compression plate 7 cm or more, the two lines of luminous bodies may be flashed to indicate over-compression. Thus, the user may intuitively have a sense about a compression depth, and decrease the compression depth while seeing the light emitting lines.

The display portion 40 is provided in the mannequin, and the mannequin 30 may include a material that transmits light emitted from the display portion 40. The LED light shows LED circulation which indicates blood circulation in an order of the heart, the head, and the heart based on the compression strength and the compression rate of the compression plate 11. For example, when a normal compression is performed and when the compression is performed at a predetermined rate, red light may be emitted. When the normal compression is not performed, green light may be emitted. When the over-compression is performed, yellow light may be emitted. Thus, the user may determine whether cardiopulmonary resuscitation is performed correctly based on the flow and the colors of the light emitting lines.

Further, a metronome may be provided in the mannequin. A rate of 110 (±2) compressions per minute may be selected. The user may perform chest compression at the accurate rate in time to beep sounds of the metronome.

The compression plate 11 of the body may include a compression spring which moves up and down or a high-intensity compression sponge which generates a return force when the user compresses the compression plate.

The chest compression may be performed when the user compresses an area at an accurate position. The light emitting lines may display how blood is ejected from the heart and flows into the brain, thereby helping a trainee to understand the principle of a heartbeat.

Hereinafter, an operating method thereof will be described in detail.

Each time the compression plate 11 is compressed, LED light indicating blood circulation moves at a speed proportional to the compression rate. The LED light stops when the compression is suspended, and moves again when the compression is restarted.

A pressure sensor kit and a depth sensor kit may be provided in the mannequin 30 to recognize a compression depth and a compression rate. When the compression depth is measured by a sensor at less than 5 cm, the light emitting line 40 may move slowly when compared to the normal compression. When the normal compression is performed, the two lines of luminous bodies corresponding to arteries may be turned on to display normal blood flow.

The user may see the light emitting line 40 indicating the circulation of blood which circulates in an order of the heart, the brain, and the heart, thereby accurately recognizing the compression depth and the compression rate.

The cardiopulmonary resuscitation training apparatus may enable the user to naturally understand not only the chest compression, but also the principle of delivering blood to the brain by squeezing the stopped heart to delay brain death.

Figure 4:
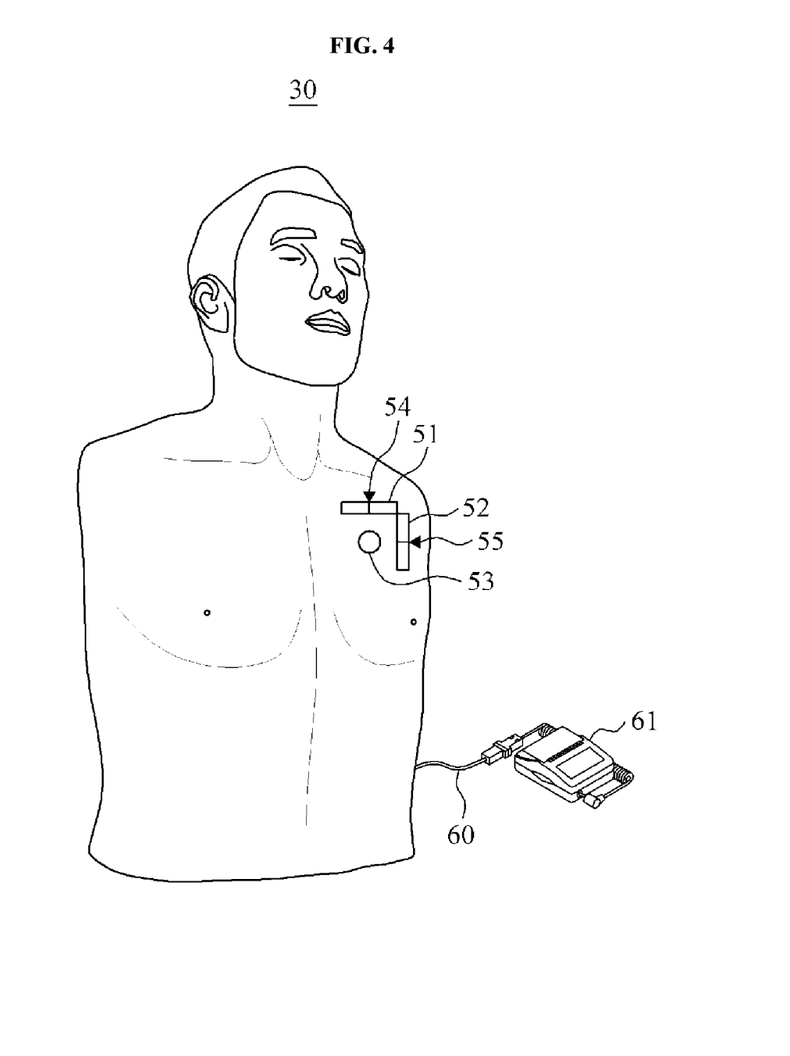
FIG. 4 illustrates a mannequin including state data.
Figure 5:
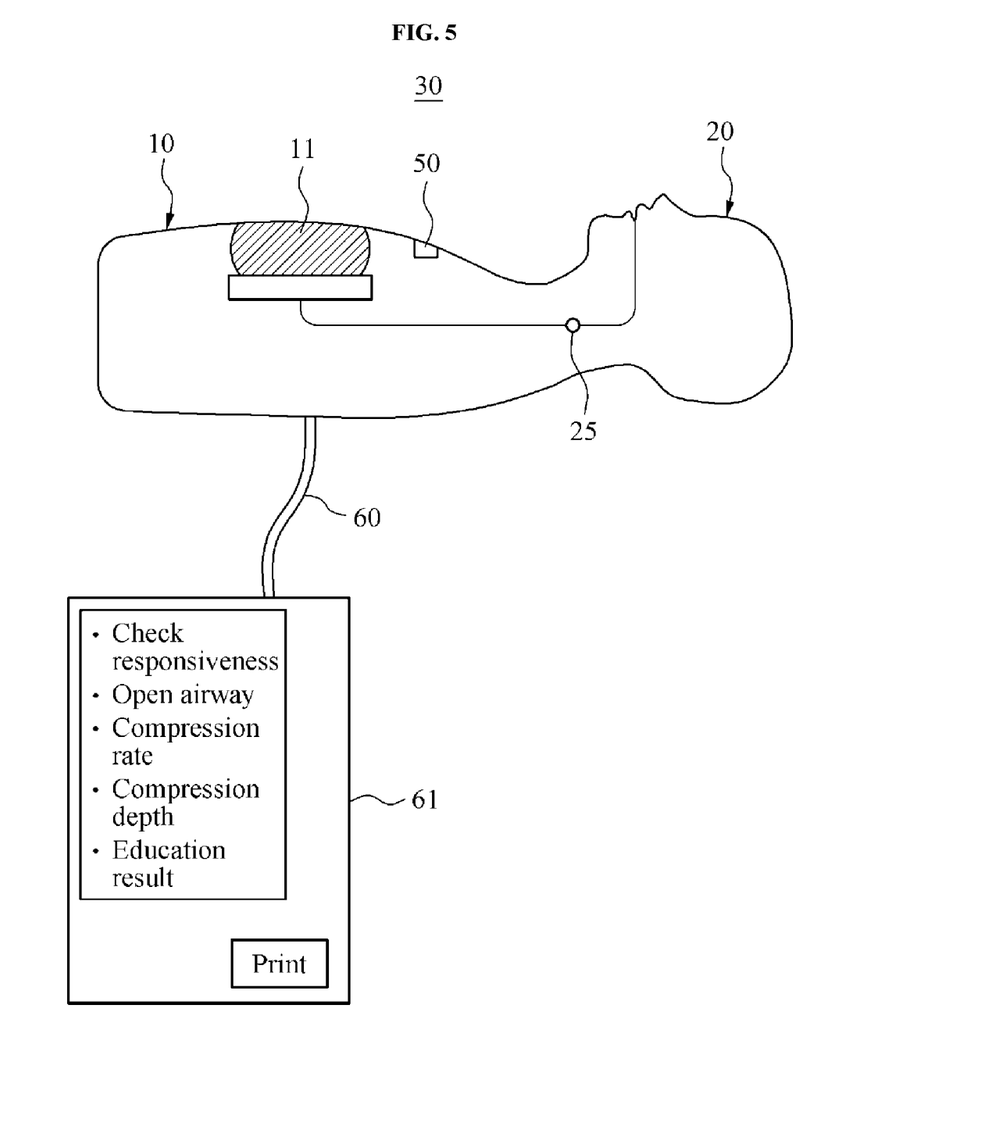
FIG. 5 illustrates a cardiopulmonary resuscitation training apparatus.
Figure 6A:
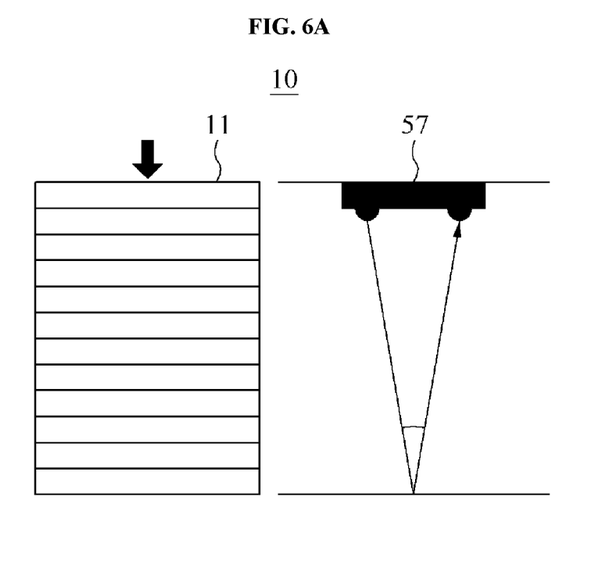
FIGS. 6A and 6B illustrate a mannequin including a distance measuring sensor.
Figure 6B:
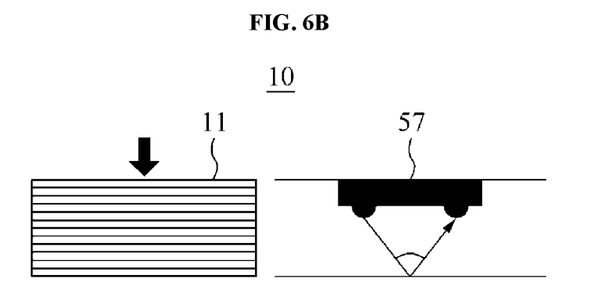

Hereinafter, FIG. 4 illustrates a mannequin including state data, FIG. 5 illustrates a cardiopulmonary resuscitation training apparatus, and FIGS. 6A and 6B illustrate a mannequin including a distance measuring sensor. Examples will be described with reference to FIGS. 4 through 6B. The mannequin 30 may include state data at an end of the body. The state data may include a rate indicator 51, a depth indicator 52, and an indicator 53.

The rate indicator 51 includes a rate bar 54 that moves laterally. The rate bar 54 moves rightward when the compression rate of the compression plate increases. The rate bar 54 moves leftward when the compression rate of the compression plate decreases. In the normal state, the rate bar 54 is at a center of the rate indicator 51.

Further, the depth indicator 52 includes a depth bar 55 that moves vertically. The depth bar 55 moves upward when the compression depth of the compression plate increases. The depth bar 55 moves downward when the compression depth is insufficient. In the normal state, the depth bar 55 is at a center of the depth indicator 51.

The indicator 53 may display O or X. The indicator 53 may display O when the rate and the depth are proper. The indicator 53 may display X when the rate and the depth are improper.

The rate indicator 51 and the depth indicator 52 may be provided in the shape of "⌐". The rate indicator may be provided in a width direction, and the depth indicator may be provided in a height direction.

The mannequin may be connected with a printer 61 through a USB communication port 60 or wirelessly. Content related to artificial ventilation and compression performed by the trainee may be output through the printer 61. Compression depth and compression rate records may be output. When the trainee performs compression at the proper depth, a success report may be output. Otherwise, a failure report may be output.

A distance measuring sensor 57 may be provided on an outer circumferential portion of the compression plate in the body of the mannequin. The compression plate 11 may be provided in a form of a spring. When the compression plate is pressed down, the spring contracts such that a height of the compression plate decreases and an angle of reflection increases. A compression distance of the user may be measured based on the angle of reflection. Conversely, when the compression plate is not pressed down, the angle of reflection with a bottom surface of the mannequin decreases. Thus, the user may know that the compression plate is not compressed. The distance measuring sensor may measure the compression distance based on only the angle of reflection.

Further, the cardiopulmonary resuscitation training apparatus 100 may be configured such that the compression plate 11 to which Lenz's law is applied moves vertically, a change in a magnetic field leads to a conversion to an electric field when the compression plate is pressed down, and the change in the magnetic field passing through a coil causes the light emitting lines of the display portion of the mannequin to emit light. According to a principle of a generator corresponding to Fleming's right hand rule, a vertical compression motion of the chest area may be converted into a circular, for example, rotary motion. When the compression plate is pressed down, kinetic energy of a conducting line may be converted into electric energy, and the light emitting lines of the display portion of the mannequin may emit light using the electric energy. The electric energy may be utilized as a power to be used by the display portion of the mannequin to emit light, for example, to operate the product.

Although a few embodiments of the present invention have been shown and described, the present invention is not limited to the described embodiments. Instead, it would be appreciated by those skilled in the art that changes may be made to these embodiments without departing from the principles and spirit of the invention, the scope of which is defined by the claims and their equivalents.

The invention claimed is:

1. A cardiopulmonary resuscitation training apparatus comprising:
   a mannequin including a body and a head;
   a compression plate provided in a chest area of the mannequin to generate a return force; and
   a display portion configured to display a state of the mannequin and blood circulation movement in a light emitting line using a light emitting diode (LED),
   wherein the light emitting line including a luminous body of LED is arranged from the body to the head and from head to the body of the mannequin to display blood circulation movement in arteries from a heart to the head,
   wherein the light emitting line includes,
      a heart line provided in a heart part of the body, and emitting light when the compression plate is compressed; and
      a first light emitting line arranged from the body to the head, a second light emitting line arranged from left to right in the head, and a third light emitting line arranged from the head to the body,
   wherein the first light emitting line, the second light emitting line, and the third light emitting line show LED circulation which indicates blood circulation in an order of the body, the head, and the body based on a compression depth and a compression rate of the compression plate.

2. The cardiopulmonary resuscitation training apparatus of claim 1, wherein a moving speed of the LED circulation varies based on the compression depth or the compression rate.

3. The cardiopulmonary resuscitation training apparatus of claim 1, wherein the LED is configured to emit a light of a first color when compression depth and the compression rate of pressure plate is proper, and to emit a light of a second color different from the first color when compression depth and the compression rate of pressure plate is improper.

4. The cardiopulmonary resuscitation training apparatus of claim 1, wherein the mannequin comprises a material that transmits the light emitted from the LED.

5. The cardiopulmonary resuscitation training apparatus of claim 1, wherein the plurality of light emitting lines are turned on when the compression plate is compressed normally, and the light emitting lines are not turned on when the compression plate is compressed insufficiently.

6. The cardiopulmonary resuscitation training apparatus of claim 1, wherein the plurality of light emitting lines are flashed when the compression plate is over-compressed.

7. The cardiopulmonary resuscitation training apparatus of claim 2, further comprising:
   state data on one side of the mannequin,
   wherein the state data comprise:
      a rate indicator including a rate bar configured to move laterally based on the compression rate;
      a depth indicator including a depth bar configured to move laterally based on the compression depth; and
      an indicator configured to display whether the compression depth and the compression rate are proper.

8. The cardiopulmonary resuscitation training apparatus of claim 1, further comprising:
   a metronome on one side of the mannequin to enable the compression plate to be compressed in time to beep sounds of the metronome.

9. The cardiopulmonary resuscitation training apparatus of claim 1, wherein the compression plate comprises at least one of a spring or a compression sponge.

10. The cardiopulmonary resuscitation training apparatus of claim 1, wherein the display portion is configured to operate when a proper area of the compression plate is compressed.

11. The cardiopulmonary resuscitation training apparatus of claim 1, further comprising:
    a distance measuring sensor on an outer circumferential portion of the compression plate to measure a compression distance based on an angle of reflection,
    wherein the angle of reflection changes when the compression plate is compressed.

12. The cardiopulmonary resuscitation training apparatus of claim 1, wherein a light emitting line in the head is turned on the compression plate is compressed at a predetermined compression rate and compression depth.

13. The cardiopulmonary resuscitation training apparatus of claim 1, wherein kinetic energy generated by compressing the compression plate is converted into electric energy and the electric energy is utilized as a power used to operate the mannequin.

* * * * *